US012535755B2

(12) United States Patent
Yamanaka

(10) Patent No.: US 12,535,755 B2
(45) Date of Patent: Jan. 27, 2026

(54) IMAGE FORMING APPARATUS

(71) Applicant: KYOCERA Document Solutions Inc., Osaka (JP)

(72) Inventor: Tatsuya Yamanaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/768,450

(22) Filed: Jul. 10, 2024

(65) Prior Publication Data

US 2025/0021034 A1 Jan. 16, 2025

(30) Foreign Application Priority Data

Jul. 12, 2023 (JP) ................................ 2023-114391

(51) Int. Cl.
*G03G 15/20* (2006.01)
*G03G 15/00* (2006.01)

(52) U.S. Cl.
CPC ....... *G03G 15/205* (2013.01); *G03G 15/2053* (2013.01); *G03G 15/2064* (2013.01); *G03G 15/5004* (2013.01); *G03G 15/5029* (2013.01); *G03G 15/80* (2013.01)

(58) Field of Classification Search
CPC ........... G03G 15/2039; G03G 15/2042; G03G 15/2046; G03G 15/205; G03G 15/65; G03G 15/657; G03G 15/70
See application file for complete search history.

(56) References Cited

U.S. PATENT DOCUMENTS

2020/0257227 A1* 8/2020 Kikuchi ................. G03G 15/80
2021/0072683 A1* 3/2021 Yoshida ............. G03G 15/2042

FOREIGN PATENT DOCUMENTS

JP 2008299205 A 12/2008

* cited by examiner

*Primary Examiner* — Thomas S Giampaolo, II
(74) *Attorney, Agent, or Firm* — Alleman Hall & Tuttle LLP

(57) ABSTRACT

A heater has a main heater block arranged in a reference area corresponding to a sheet having a reference size and a sub-heater block arranged in an outer-side area. An outer-side sheet sensor detects the sheet at a location within the outer-side area between a transfer device and a fixing device. The control device, depending on target size information representing a size of a target sheet, controls a power supply state between a first power supply state and a second power supply state. The control device, in a case in which the target size information represents a size exceeding the reference size, and depending on whether or not the outer-side sheet sensor detects the target sheet, further controls a conveying interval between the target sheet and a next sheet following the target sheet to one of a first interval and a second interval longer than the first interval.

3 Claims, 4 Drawing Sheets

IMAGE FORMING APPARATUS

INCORPORATION BY REFERENCE

This application is based upon and claims the benefit of priority from the corresponding Japanese Patent Application No. 2023-114391 filed on Jul. 12, 2023, the entire contents of which are incorporated herein by reference.

BACKGROUND

The present disclosure relates to an image forming apparatus including a fixing device including a plurality of heater blocks whose power supply state is switched depending on a size of a sheet.

An electrophotographic image forming apparatus includes a transfer device and a fixing device. The transfer device transfers a toner image onto a sheet being conveyed. The fixing device fixes the toner image on the sheet by heating and pressing the toner image on the sheet.

In addition, a heater of the fixing device that includes a plurality of electrodes divided in a width direction perpendicular to a sheet conveying direction is known. Thus, the heater is divided into a plurality of heater blocks whose power supply state is switched depending on the size of the sheet.

SUMMARY

An image forming apparatus according to a first aspect of the present disclosure includes a sheet conveying device, a transfer device, a fixing device, a sheet detection portion, and a control device. The sheet conveying device is capable of sequentially conveying a plurality of sheets. The transfer device transfers a toner image onto each of the plurality of sheets being conveyed. The fixing device includes a heater configured to heat the toner image on each of the plurality of sheets sequentially conveyed from the transfer device, and a pressure portion configured to press each of the plurality of sheets toward the heater. The sheet detection portion is arranged on an upstream side of the fixing device in a sheet conveying direction, and detects each of the plurality of sheets being conveyed. The control device controls power supplied to the heater and controls the sheet conveying device. The heater includes a main heater block arranged in a reference area corresponding to the sheet having a reference size in a main direction crossing the sheet conveying direction, and a sub-heater block arranged in an outer-side area adjacent to the reference area in the main direction and corresponding to the sheet having a size larger than the reference size. The sheet detection portion includes an outer-side sheet sensor configured to detect the sheet at a position within the outer-side area in the main direction between the transfer device and the fixing device. The control device acquires target size information representing a size of a target sheet reaching the fixing device. The control device, depending on whether the target size information represents a size within the reference size or a size exceeding the reference size, further controls a power supply state of supplying power to the heater so as to be one of a first power supply state in which power is supplied only to the main heater block, and a second power supply state in which power is supplied to the main heater block and the sub-heater block. The control device, in a case in which the target size information represents a size exceeding the reference size, and depending on whether or not the outer-side sheet sensor detects the target sheet, further controls a conveying interval between the target sheet and a next sheet following the target sheet to one of a first interval and a second interval longer than the first interval.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments according to the present disclosure will be described below with reference to the drawings. Note that the following embodiments are examples that embody a technique according to the present disclosure, and do not limit the technical scope of the present disclosure.

[Configuration of Image Forming Apparatus 10]

Figure 1:
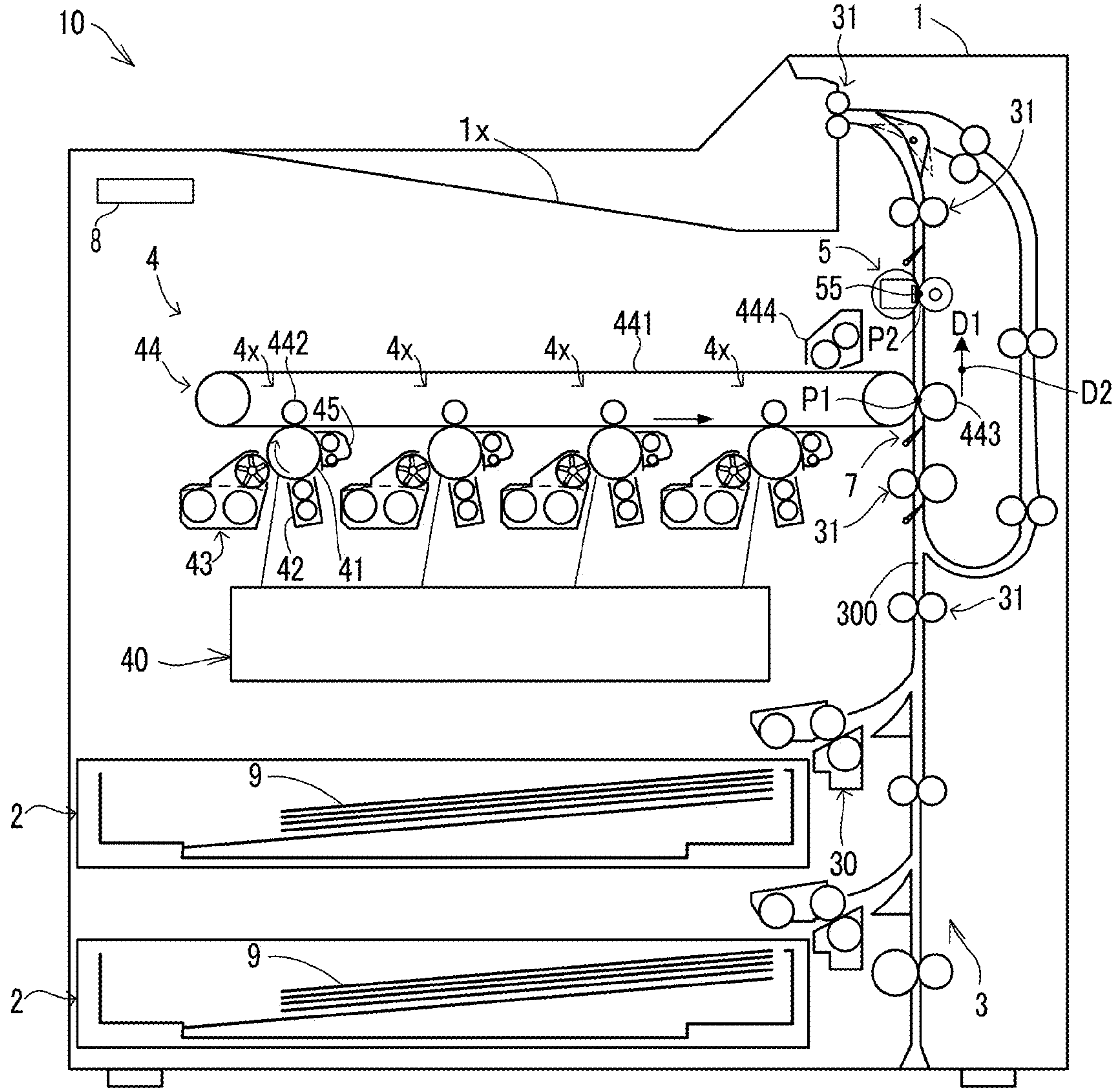
FIG. 1 is a configuration diagram of an image forming apparatus according to an embodiment.

As shown in FIG. 1, an image forming apparatus 10 includes a sheet conveying device 3, a printing device 4, and a control device 8 provided within a main portion 1.

The printing device 4 executes a printing process to form an image on a sheet 9. The printing device 4 executes the printing process using an electrophotographic method. The sheet 9 is an image forming medium such as paper or a sheet-like resin member.

The sheet conveying device 3 includes a sheet feeding device 30 and a plurality of conveying roller pairs 31. The sheet feeding device 30 feeds out the sheet 9 stored in a sheet storing portion 2 to a conveying path 300 within the main portion 1. The conveying path 300 forms a path along which the sheet 9 is conveyed.

The plurality of conveying roller pairs 31 are rotationally driven by a motor (not shown). The plurality of conveying roller pairs 31 rotate to convey the sheet 9 along the conveying path 300, and further discharge the sheet 9 to a discharge tray 1*x*.

The sheet 9 passes through a transfer position P1 and a fixing position P2 on the conveying path 300, and is discharged to the discharge tray 1*x*.

In the following description, the sheet conveying direction along the conveying path 300 will be referred to as a conveying direction D01. A fixing position P2 is a position on a downstream side in the conveying direction D01 with respect to the transfer position P1.

In addition, a direction crossing the conveying direction D01 of the conveying path 300 is referred to as a main direction D1. In the present embodiment, the main direction D1 is a direction perpendicular to the conveying direction D01. The main direction D1 is a main scanning direction in the printing process.

The printing device 4 forms a toner image on the sheet 9 conveyed along the conveying path 300. The toner image is a developing agent image using toner as a developing agent. The toner is an example of a granular developing agent.

The printing device 4 includes one or more image forming portions 4x, a laser scanning unit 40, a transfer device 44, and a fixing device 5. The image forming portion 4x includes a drum-shaped photoconductor 41, a charging device 42, a developing device 43, a drum cleaning device 45, and the like.

The image forming apparatus 10 shown in FIG. 1 is a tandem type color image forming apparatus. Therefore, the printing device 4 includes four image forming portions 4x corresponding to the four toner colors of yellow, cyan, magenta, and black.

In the image forming portion 4x, the photoconductor 41 rotates, and the charging device 42 charges a surface of the photoconductor 41. Furthermore, the laser scanning unit 40 writes an electrostatic latent image on a surface of the photoconductor 41 by scanning with a laser beam.

Further, the developing device 43, by supplying the toner to the surface of the photoconductor 41, develops the electrostatic latent image as the toner image. The photoconductor 41 is an example of an image-carrying member that rotates while carrying the toner image.

The transfer device 44 transfers the toner image onto the sheet 9 at the transfer position P1 on the conveying path 300. The transfer device 44 includes an intermediate transfer belt 441, four primary transfer devices 442 corresponding to the four image forming portions 4x, a secondary transfer device 443, and a belt cleaning device 444.

In the transfer device 44, the primary transfer devices 442 transfer the toner image on the surface of the photoconductors 41 to the surface of the intermediate transfer belt 441. Thus, the color toner image is formed on the surface of the intermediate transfer belt 441.

The secondary transfer device 443 transfers the toner image formed on the intermediate transfer belt 441 onto the sheet 9 in the conveying path 300.

Note that in a case in which the image forming apparatus 10 is a monochrome image forming apparatus, the secondary transfer device 443 transfers the toner image on the photoconductor 41 onto the sheet 9 in the conveying path 300.

The drum cleaning device 45 removes waste toner remaining on the surface of the photoconductor 41. The belt cleaning device 444 removes the waste toner remaining on the intermediate transfer belt 441.

[Fixing Device 5]

The fixing device 5 heats and presses the toner image on the sheet 9 while conveying the sheet 9 at a fixing position P2 on the conveying path 300. Thus, the fixing device 5 fixes the toner image on the sheet 9 to the sheet 9.

Figure 2:
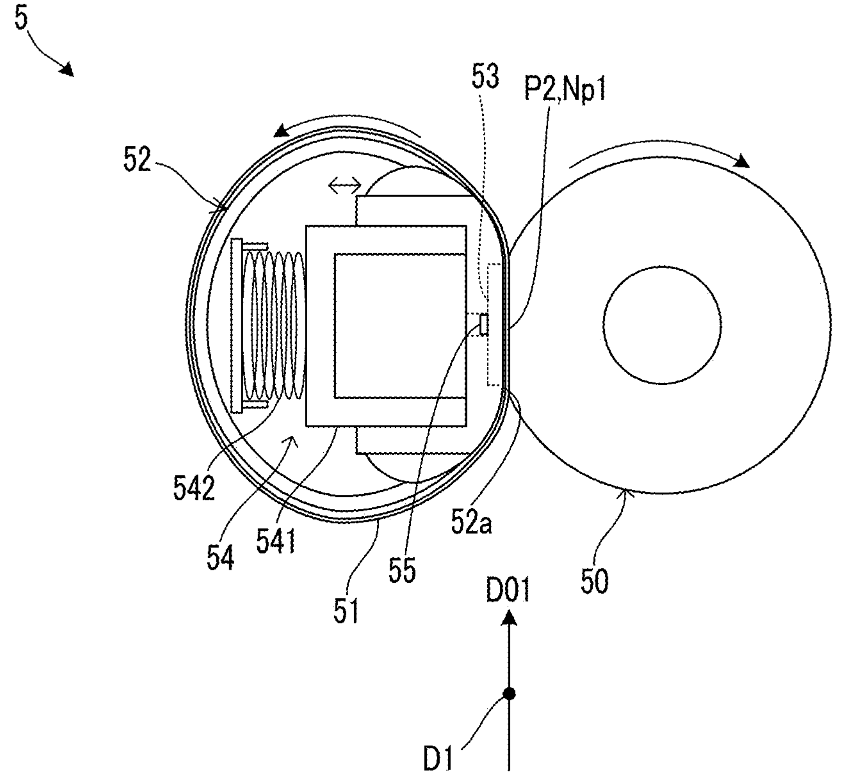
FIG. 2 is a configuration diagram of a fixing device in an image forming apparatus according to an embodiment.

As shown in FIG. 2, the fixing device 5 includes a pressure roller 50, a fixing member 51, a support member 52, a heater 53, a biasing mechanism 54, and a temperature detection portion 55. The pressure roller 50, the fixing member 51, the support member 52, and the heater 53 are each arranged along the main direction D1 at the fixing position P2.

The fixing member 51 is a flexible cylindrical member. In other words, the fixing member 51 is an endless belt-shaped flexible cylinder. For example, the fixing member 51 is a cylindrical film member. The fixing member 51 is rotatably supported by a support member 52.

The pressure roller 50, by coming into pressure contact with the fixing member 51, forms a nip Np1 between the pressure roller 50 and the fixing member 51 (see FIG. 2).

The pressure roller 50 presses the sheet 9 passing through the fixing position P2 against the fixing member 51. Thus, the sheet 9 is pressed toward the heater 53. The pressure roller 50 is an example of a pressure portion that presses the sheet 9 toward the heater 53.

The support member 52 rotatably supports the fixing member 51. Furthermore, the support member 52 supports the heater 53. The support member 52 has an opposing portion 52a that faces the pressure roller 50 with the fixing member 51 in between. The opposing portion 52a comes in contact with the inner surface of the fixing member 51.

The heater 53 is incorporated into the opposing portion 52a. Thus, the heater 53 is supported by the support member 52 along the main direction D1. The pressure roller 50, the fixing member 51, and the support member 52 are formed to extend in the main direction D1. The heater 53 comes in contact with an inner surface of the fixing member 51.

The biasing mechanism 54 includes a pressing member 541 and a spring 542. The spring 542 elastically biases the opposing portion 52a toward the pressure roller 50 via the pressing member 541. That is, the biasing mechanism 54 elastically biases the fixing member 51 toward the pressure roller 50 via the support member 52.

The pressure roller 50 is rotated by being driven by a motor (not shown). The pressure roller 50 rotates the fixing member 51 in a driven manner. Due to the driven rotation of the fixing member 51, the inner surface of the fixing member 51 slides with respect to the heater 53 and the opposing portion 52a. A lubricant is applied to the inner surface of the fixing member 51.

The heater 53 heats the toner image on the sheet 9 that is conveyed from the transfer device 44. More specifically, the heater 53 heats the sheet 9 via a portion of the fixing member 51 that forms the nip Np1.

The temperature detection portion 55 detects the temperature of the heater 53. The temperature detected by the temperature detection portion 55 is used for fixing-temperature control. The fixing-temperature control is a feedback control that controls the power supplied to the heater 53 by comparing the temperature detected by the temperature detection portion 55 with a preset target temperature.

[Control Device 8]

The control device 8 executes various types of data processing and controls devices such as the sheet conveying device 3 and the printing device 4. The control targets to be controlled by the control device 8 include conveying the sheet 9 by the sheet conveying device 3 and power supply to the heater 53 of the fixing device 5.

Figure 3:
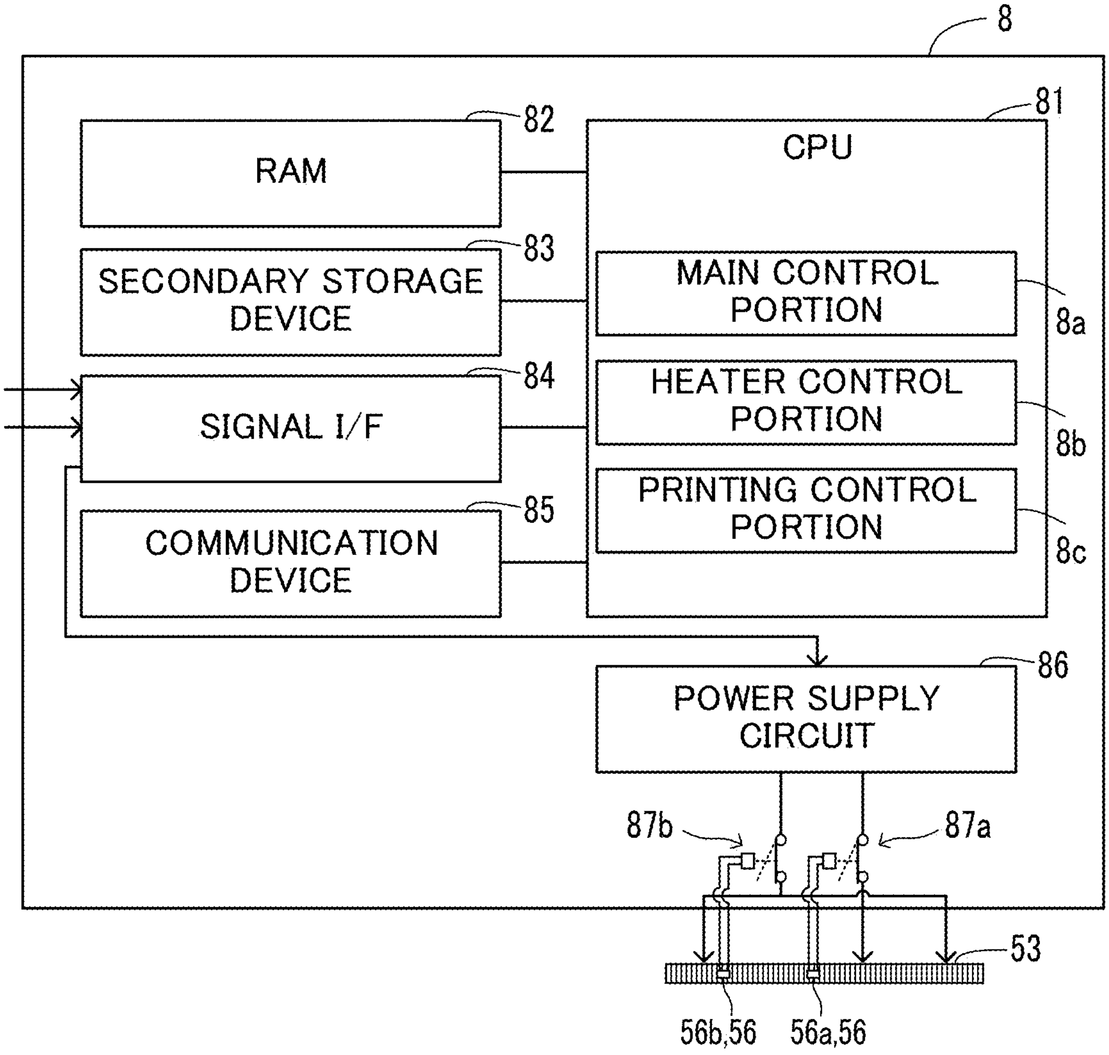
FIG. 3 is a block diagram showing a configuration of a control device in an image forming apparatus according to an embodiment.

As shown in FIG. 3, the control device 8 includes a central processing unit (CPU) 81 and peripheral devices. The peripheral devices include a random access memory (RAM) 82, a secondary storage device 83, a signal interface 84, and the like.

Furthermore, the control device 8 includes a communication device 85 and a power supply circuit 86.

The CPU 81 is a processor that executes various types of data processing and control by executing a computer program.

The RAM 82 is a computer readable volatile storage device. The RAM 82 temporarily stores the computer program executed by the CPU 81 and data output and referenced during the process of the CPU 81 executing various types of processes.

The CPU 81 includes a plurality of processing modules achieved by executing the computer program. The plurality of processing modules include a main control portion 8*a*, a heater control portion 8*b*, a printing control portion 8*c*, and the like.

The main control portion 8*a* executes start control for starting various types of processes in response to operations on an operating device (not shown).

The heater control portion 8*b* controls an amount of power supplied to the heater 53 by the fixing-temperature control. The heater control portion 8*b* adjusts the amount of power supplied to the heater 53 by controlling the power supply circuit 86.

The power supply circuit 86 supplies power to the heater 53 according to a power supply command from the heater control portion 8*b*.

The printing control portion 8*c* controls the sheet conveying device 3. Furthermore, the printing control portion 8*c* causes the printing device 4 to execute the printing process in synchronization with conveying the sheet 9 by the sheet conveying device 3.

The control device 8, due to the operation of the heater control portion 8*b* and the printing control portion 8*c*, controls the power supply to the heater 53 and controls the sheet conveying device 3, as well as controls the image forming portions 4*x* and the transfer device 44.

The secondary storage device 83 is a computer-readable nonvolatile storage device. For example, one or both of a flash memory and a hard disk drive may be employed as the secondary storage device 83.

The signal interface 84 converts detection signals output by various types of sensors into digital data, and transmits the digital data to the CPU 81. Furthermore, the signal interface 84 converts a control command output by the CPU 81 into a control signal, and transmits the control signal to the device that is the control target.

The communication device 85 executes communication with other devices such as a host device that transmits printing jobs to the image forming apparatus 10. The CPU 81 communicates with the other devices via the communication device 85.

Figure 4:
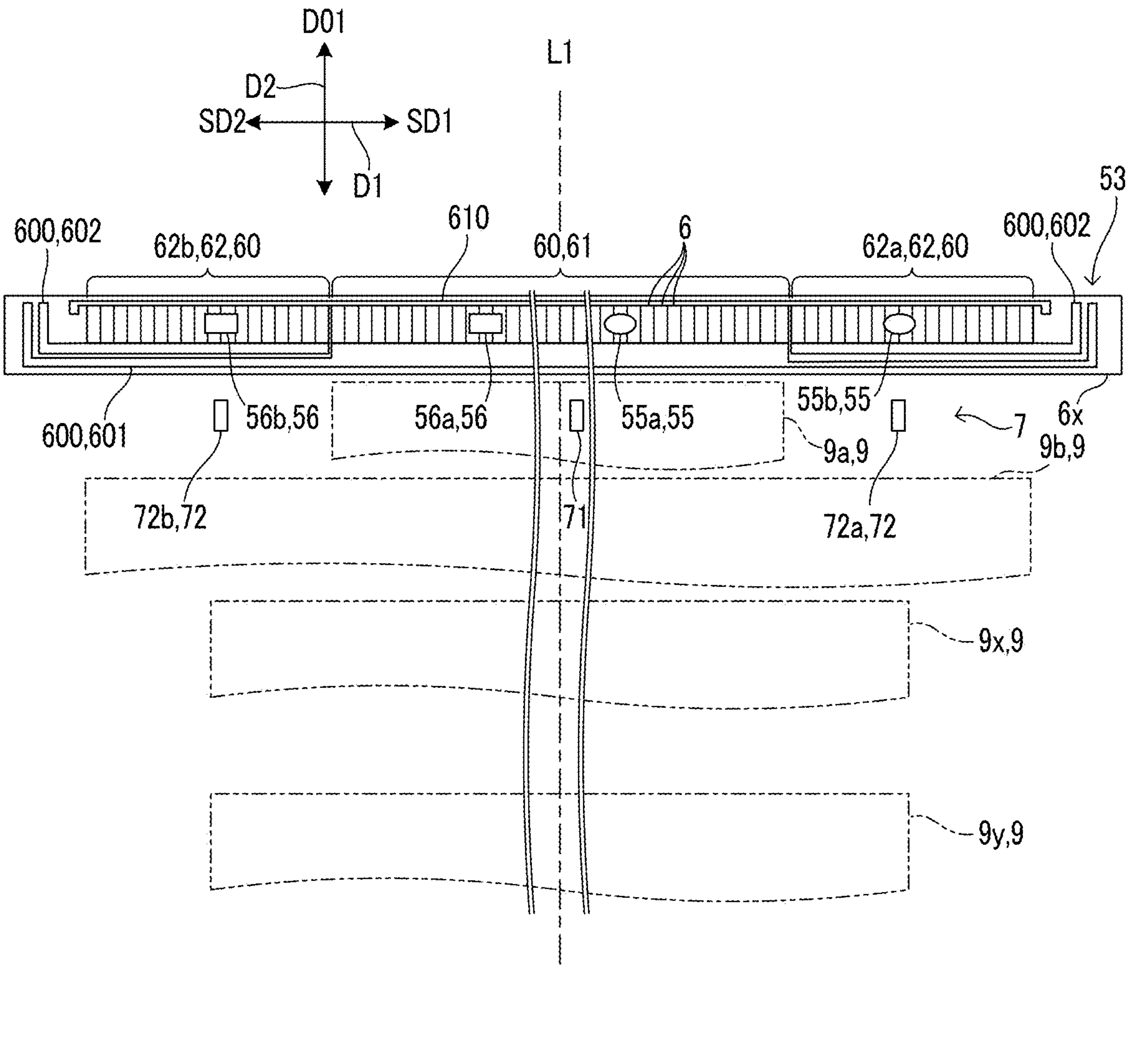
FIG. 4 is a configuration diagram of a heater and a sheet detection portion in an image forming apparatus according to an embodiment.

In the present embodiment, the heater 53 is a planar heater having a plurality of resistors 6 (see FIG. 4).

The heater 53 includes a base material 6*x*, a plurality of heater blocks 60, a plurality of power supply electrodes 600, and a ground electrode 610 (see FIG. 4).

The base material 6*x* is a non-conductive film. The plurality of heater blocks 60, the plurality of power supply electrodes 600, and the ground electrode 610 are formed on the base material 6*x*.

Each of the plurality of heater blocks 60 has a plurality of resistors 6 arranged in the main direction D1. Each of the resistors 6 is a heating element that generates heat when supplied with electric power.

In each of the figures, a sub-direction D2 is a direction along the conveying direction D01. The sub-direction D2 is a direction that crosses the main direction D1. The main direction D1 is a longitudinal direction of the heater 53. The sub-direction D2 is a lateral direction of the heater 53.

The plurality of power supply electrodes 600 are each connected to a first end in the sub-direction D2 of the plurality of heater blocks 60. The ground electrode 610 is connected to a second end in the sub-direction D2 of the plurality of heater blocks 60.

In the present embodiment, the sheet conveying device 3 conveys the sheet 9 with a center of the sheet 9 in the main direction D1 as a reference.

The heater 53 is divided into a main heater block 61 and a pair of sub-heater blocks 62 (see FIG. 4). The main heater block 61 is arranged in a reference area in the main direction D1. The pair of sub-heater blocks 62 are respectively arranged in a pair of outer-side areas adjacent to the reference area in the main direction D1.

The reference area is an area corresponding to a first size sheet 9*a*, which is a sheet 9 having a predetermined reference size. The pair of outer-side areas correspond to a second size sheet 9*b*, which is a sheet 9 having a size larger than the reference size.

In FIG. 4, various types of sheets 9 including the first size sheet 9*a* and the second size sheet 9*b* are shown by imaginary lines (two-dot chain lines). In FIG. 4, a center line L1 is a straight line passing through the center of the reference area in the main direction D1 and along the conveying direction D01.

The first size sheet 9*a* passes through the reference area at the fixing position P2. The second size sheet 9*b* passes through the reference area and the pair of outer-side areas at the fixing position P2.

The plurality of power supply electrodes 600 include a main electrode 601 connected to the first end of the main heater block 61 and a pair of sub-electrodes 602 connected to the first ends of the pair of sub-heater blocks 62 (see FIG. 4).

The power supply circuit 86 can individually supply power to the main heater block 61 and the sub-heater blocks 62 via one or both of the main electrode 601 and the pair of sub-electrodes 602.

In the image forming apparatus 10, the control device acquires information representing the size of the sheet 9 being conveyed, and switches the power supply state to the plurality of heater blocks 60 according to the size represented by the acquired information.

In the present embodiment, sheet size information representing the size of the sheet 9 stored in the sheet storing portion 2 is stored in the secondary storage device 83 in advance. In addition, the printing job includes supply source information that specifies the sheet storing portion 2 that is the supply source of the target sheet 9*x*.

The sheet size information corresponding to the supply source information included in the printing job is target size information representing the size of the target sheet 9*x*.

When the printing process is executed, the heater control portion 8*b* acquires the target size information corresponding to the target sheet 9*x* from the secondary storage device 83.

Furthermore, the heater control portion 8*b* controls the power supply state to the heater 53 to one of a first power supply state and a second power supply state, depending on whether the target size information represents a size within the reference size or a size exceeding the reference size.

The first power supply state is a state in which power is supplied only to the main heater block 61. The second power supply state is a state in which power is supplied to the main heater block 61 and the pair of sub-heater blocks 62.

In a case in which the target size information is incorrect information representing a size larger than the actual size of the target sheet 9*x*, a situation occurs in which an amount of heat radiated to the target sheet 9*x* is smaller than an expected amount of heat in the pair of sub-heater blocks 62.

In addition, the target sheet 9*x* may be conveyed in a state shifted in the main direction D1 from an expected position.

In this case as well, a situation occurs in which the amount of heat radiated to the target sheet 9*x* is smaller than the expected amount of heat in one of the pair of sub-heater blocks 62.

The image forming apparatus 10 may execute a continuous printing process. When the continuous printing process is executed, the sheet conveying device 3 sequentially conveys a plurality of sheets 9. The transfer device 44 transfers the toner image onto each of the plurality of sheets 9 being conveyed.

Furthermore, in the fixing device 5, the heater 53 heats the toner image on each of the plurality of sheets 9 sequentially conveyed from the transfer device 44, and the pressure roller 50 applies pressure to each of the plurality of sheets 9 toward the heater 53.

When the continuous printing process is executed, in a case in which the target size information is the incorrect information, or in a case in which the plurality of sheets 9 are conveyed in a shifted state in the main direction D1, there is a possibility that the temperature of one or both of the pair of sub-heater blocks 62 may rise above the expected temperature.

That is, when the continuous printing process is executed, there is a risk that the temperature of some of the plurality of heater blocks 60 may rise excessively due to an error in the target size information or a shift in the conveying position of the target sheet 9*x*.

The image forming apparatus 10 includes a configuration for preventing the temperature of some of the plurality of heater blocks 60 from rising excessively when the continuous printing process is executed. The configuration will be explained below.

In the fixing device 5, the temperature detection portion 55 includes a main temperature sensor 55*a* and a sub-temperature sensor 55*b* (see FIG. 4). For example, each of the main temperature sensor 55*a* and the sub temperature sensor 55*b* is a thermistor.

The main temperature sensor 55*a* detects the temperature of the main heater block 61. The sub-temperature sensor 55*b* detects the temperature of one of the pair of sub-heater blocks 62.

The pair of second sub-heater blocks 62 includes a first sub-heater block 62*a* and a second sub-heater block 62*b* (see FIG. 4). A first sub-heater block 62*a* is arranged adjacent to the main heater block 61 on a first side SD1 in the main direction D1. A second sub-heater block 62*b* is arranged adjacent to the main heater block 61 on a second side SD2 in the main direction D1.

The pair of outer-side areas includes a first outer-side area adjacent to the first side SD1 in the main direction D1 with respect to the reference region, and a second outer-side area adjacent to the second side SD2 in the main direction D1 with respect to the reference region.

The first sub-heater block 62*a* is arranged in the first outer-side area in the main direction D1, and the second sub-heater block 62*b* is arranged in the second outer-side area in the main direction D1. The sub-temperature sensor 55*b* detects the temperature of the first sub-heater block 62*a*.

In the present embodiment, the heater control portion 8*b* controls the power supply amount to the main heater block 61 in the first power supply state by the feedback control of the temperature detected by the main temperature sensor 55*a*.

Similarly, the heater control portion 8*b* controls the power supply amount to the main heater block 61 and the pair of sub-heater blocks 62 in the second power supply state by the feedback control of the temperature detected by the main temperature sensor 55*a*.

Furthermore, the heater control portion 8*b* stops power supply to the main heater block 61 when the temperature detected by the main temperature sensor 55*a* exceeds a preset upper limit temperature. Similarly, the heater control portion 8*b* stops power supply to the sub-heater blocks 62 when the temperature detected by the sub-temperature sensor 55*b* exceeds the upper limit temperature.

Note that the heater control portion 8*b* may stop power supply to the main heater block 61 and the sub-heater blocks 62 when the detected temperature of at least one of the main temperature sensor 55*a* and the sub-temperature sensor 55*b* exceeds the upper limit temperature.

The fixing device 5 further includes two thermal protectors 56 (see FIG. 4). Each thermal protector 56 is a bimetallic thermostat.

The two thermal protectors 56 include a first thermal protector 56*a* and a second thermal protector 56*b* (see FIG. 4). The first thermal protector 56*a* is arranged in the main heater block 61 of the heater 53. The second thermal protector 56*b* is arranged in the second sub-heater block 62*b* of the heater 53.

The first thermal protector 56*a* electrically cuts off a power supply line to the main heater block 61 when the temperature of the main heater block 61 exceeds an allowable temperature. The second thermal protector 56*b* electrically cuts off a power supply line to the pair of sub-heater blocks 62 when the temperature of the second sub-heater block 62*b* exceeds the allowable temperature.

In the example shown in FIG. 3, the control device 8 further includes a first cutoff circuit 87*a* electrically connected to the first thermal protector 56*a*, and a second cutoff circuit 87*b* electrically connected to the second thermal protector 56*b*.

The first thermal protector 56*a* operates when the temperature of the main heater block 61 exceeds the allowable temperature, and the first cutoff circuit 87*a* electrically cuts off the power supply line to the main heater block 61 when the first thermal protector 56*a* operates.

The second thermal protector 56*b* operates when the temperature of the second sub-heater block 62*b* exceeds the allowable temperature, and the second cutoff circuit 87*b* electrically cuts off the power supply line to the pair of sub-heater blocks 61 when the second thermal protector 56*b* operates.

The second thermal protector 56*b* is arranged at a line-symmetrical position with respect to a position of the sub-temperature sensor 55*b* with respect to the center line L1 of the second sub-heater block 62*b*.

In the case described above, when the target sheet 9*x* is conveyed in a state shifted to the first side SD1 in the main direction D1, the target sheet 9*x* tends to separate from the position of the second thermal protector 56*b*. In this case, a state in which the temperature of the second sub-heater block 62*b* exceeds the allowable temperature is easily detected by the second thermal protector 56*b*.

On the other hand, in a case in which the target sheet 9*x* is conveyed in a state shifted to the second side SD2 in the main direction D1, the target sheet 9*x* is likely to separate from the position of the sub-temperature sensor 55*b*. In this case, the state in which the temperature of the first sub-heater block 62*a* exceeds the upper limit temperature is easily detected by the sub-temperature sensor 55*b*.

Therefore, in a case in which the position of the target sheet 9*x* in the main direction D1 is shifted, the power supply to the pair of sub-heater blocks 62 before the temperature of the first sub-heater block 62*a* or the second sub-heater block 62*b* increases excessively is reliably cut off.

In the present embodiment, the first thermal protector 56*a* is arranged at a line-symmetrical position with respect to the position of the main temperature sensor 55*a* with respect to the center line L1 of the main heater block 61.

For example, the main temperature sensor 55*a* and the first thermal protector 56*a* are arranged at positions corresponding to both end portions n the main direction D1 of the sheet 9 assumed to have a minimum size i.

The image forming apparatus 10 further includes a sheet detection portion 7 arranged on an upstream side in the conveying direction D01 of the fixing device 5 (see FIGS. 1 and 4). When the continuous printing process is executed, the sheet detection portion 7 detects each of the plurality of sheets 9 being conveyed.

In the present embodiment, the sheet detection portion 7 includes a main sheet sensor 71 and a pair of outer-side sheet sensors 72 (see FIG. 4).

For example, each of the main sheet sensor 71 and the pair of outer-side sheet sensors 72 includes a pivoting member and a photo sensor. The pivoting member is supported so as to be able to pivot, and pivots by coming into contact with each of the sheets 9 being conveyed. The photo sensor detects that the pivoting member has pivoted.

The main sheet sensor 71 detects each sheet 9 at a position within the reference area in the main direction D1 between the transfer device 44 and the fixing device 5. Each of the pair of outer-side sheet sensors 72 detects each sheet 9 at a position within each of the pair of outer-side areas in the main direction D1 between the transfer device 44 and the fixing device 5.

The pair of outer-side sheet sensors 72 includes a first outer-side sheet sensor 72*a* and a second outer-side sheet sensor 72*b* (see FIG. 4). The first outer-side sheet sensor 72*a* detects the sheet 9 in the first outer-side area in the main direction D1. The second outer-side sheet sensor 72*b* detects the sheet 9 in the second outer-side area in the main direction D1.

When the continuous printing process is executed, the printing control portion 8*c* executes conveying interval control in a case in which the target size information indicates a size exceeding the reference size.

In a case in which the target sheet 9*x* of the reference size is conveyed at the original position in the main direction D1, both end portions in the main direction D1 of the target sheet 9*x* pass the positions of the pair of outer-side sheet sensors 72.

The conveying interval control is a control by which the conveying interval between the target sheet 9*x* and the next sheet 9*y* is set to one of a first interval and a second interval, depending on whether or not the pair of outer-side sheet sensors 72 detect the target sheet 9*x*. The second interval is longer than the first interval.

The next sheet 9*y* is the sheet 9 that is conveyed following the target sheet 9*x* in the continuous printing process (see FIG. 4).

In the conveying interval control, in a case in which both the first outer-side sheet sensor 72*a* and the second outer-side sheet sensor 72*b* detect the target sheet 9*x*, the printing control portion 8*c* sets the conveying interval between the target sheet 9*x* and the next sheet 9*y* to the first interval.

In the conveying interval control, in a case in which at least one of the first outer-side sheet sensor 72*a* and the second outer-side sheet sensor 72*b* detects the target sheet 9*x*, the printing control portion 8*c* sets the conveying interval between the target sheet 9*x* and the next sheet 9*y* to the second interval.

In a case in which the target sheet 9*x* is conveyed at a position shifted in the main direction D1, a situation is likely to occur in which one of the pair of outer-side sheet sensors 72 does not detect the target sheet 9*x*. In addition, in a case in which the target size information is incorrect information representing a size larger than the actual size of the target sheet 9*x*, a situation is likely to occur in which one or both of the pair of outer-side sheet sensors 72 does not detect the target sheet 9*x*.

On the other hand, by widening the conveying interval between the target sheet 9*x* and the next sheet 9*y*, the power supply amount to the heater 53 from when the target sheet 9*x* passes the fixing position P2 until the next sheet 9*y* reaches the fixing position P2 is reduced.

By executing the conveying interval control, excessive rising of the temperature of one or both of the pair of sub-heater blocks 62 due to a positional shift of the target sheet 9*x* or an error in the target size information can be avoided.

In the present embodiment, the sub-temperature sensor 55*b* is arranged at a position that overlaps with the position of the first outer-side sheet sensor 72*a* in the main direction D1. In the example shown in FIG. 4, the sub-temperature sensor 55*b* is arranged at the same position as the first outer-side sheet sensor 72*a* in the main direction D1. Thus, the temperature detected by the sub-temperature sensor 55*b* indicates a temperature that reflects a state of whether or not the target sheet 9*x* passes the position of the first outer-side sheet sensor 72*a*.

In the present embodiment, the second thermal protector 56*b* is arranged at a position that overlaps with the position of the second outer-side sheet sensor 72*b* in the main direction D1. In the example shown in FIG. 4, the second thermal protector 56*b* is arranged at the same position as the second outer-side sheet sensor 72*b* in the main direction D1. Thus, the second thermal protector 56*b* operates according to the temperature that reflects the state of whether or not the target sheet 9*x* passes the position of the second outer-side sheet sensor 72*b*.

First Application Example

Next, a first application example of the image forming apparatus 10 will be described. Hereinafter, aspects in the present application example that are different from the image forming apparatus 10 will be explained.

In the present application example, the heater control portion 8*b* controls the power supply amount supplied to the main heater block 61 in the first power supply state by the feedback control of the temperature detected by the main temperature sensor 55*a*. This control is the same as the control in the image forming apparatus 10.

On the other hand, the heater control portion 8*b*, in the second power supply state, controls the power supply amount supplied to the main heater block 61 by the feedback control of the temperature detected by the main temperature sensor 55*a*; however, executes different control for controlling the power supply amount supplied to the pair of sub-heater blocks 62.

In the second power supply state, the heater control portion 8*b* in the present application example controls the power supply amount supplied to the pair of sub-heater blocks 62 by the feedback control of the temperature detected by the sub-temperature sensor 55*b*.

Even in a case in which the present application example is adopted, the same effects as a case in which the image forming apparatus 10 is adopted may be obtained.

Second Application Example

Next, a second application example of the image forming apparatus 10 will be described. Hereinafter, aspects in the present application example that are different from the image forming apparatus 10 will be explained.

In the present application example, the sheet conveying device 3 conveys the sheet 9 with one end in the main direction D1 of the sheet 9 as a reference. Therefore, in the present application example, the heater 53 is divided into one main heater block 61 and one sub-heater block 62.

In the present application example, the sub-temperature sensor 55*b* and the second thermal protector 56*b* are arranged at different positions in the one sub-heater block 62.

In this application example, the second outer-side sheet sensor 72*b* of the pair of outer-side sheet sensors 72 in the image forming apparatus 10 is not provided.

Even in a case in which the present application example is adopted, the same effects as a case in which the image forming apparatus 10 is adopted may be obtained.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a sheet conveying device configured to be able to sequentially convey a plurality of sheets;

a transfer device configured to transfer a toner image onto each of the plurality of sheets being conveyed;

a fixing device including a heater configured to heat the toner image on each of the plurality of sheets sequentially conveyed from the transfer device, and a pressure portion configured to press each of the plurality of sheets toward the heater;

a sheet detection portion arranged on an upstream side of the fixing device in a sheet conveying direction, and configured to detect each of the plurality of sheets being conveyed;

a control device configured to control power supply to the heater and the sheet conveying device;

a main temperature sensor;

a sub-temperature sensor;

a first thermal protector; and a second thermal protector, wherein the heater includes a main heater block arranged in a reference area corresponding to a sheet having a reference size in a main direction crossing the sheet conveying direction, and a sub-heater block arranged in an outer-side area adjacent to the reference area in the main direction and corresponding to a sheet having a size larger than the reference size;

the outer-side area includes a first outer-side area and a second outer-side area adjacent to both sides of the reference area;

the sub-heater block includes a first sub-heater block arranged in the first outer-side area and a second sub-heater block arranged in the second outer-side area;

the main temperature sensor detects a temperature of the main heater block;

the sub-temperature sensor detects a temperature of the first sub-heater block;

the first thermal protector is arranged at the main heater block and is configured to electrically cut off a power supply line to the main heater block when the temperature of the main heater block exceeds an allowable temperature;

the second thermal protector is arranged at the second sub-heater block and is configured to electrically cut off a power supply line to the sub-heater block when a temperature of the second sub-heater block exceeds an allowable temperature;

the second thermal protector is arranged at a line-symmetrical position with respect to a position of the sub-temperature sensor with respect to a center line passing through a center of the reference area in the main direction and along the sheet conveying direction;

the sheet detection portion includes an outer-side sheet sensor configured to detect the sheet at a position within the outer-side area in the main direction between the transfer device and the fixing device;

the control device acquires target size information representing a size of a target sheet reaching the fixing device;

the control device, depending on whether the target size information represents a size within the reference size or a size exceeding the reference size, further controls a power supply state of supplying power to the heater so as to be one of a first power supply state in which power is supplied only to the main heater block, and a second power supply state in which power is supplied to the main heater block and the sub-heater block;

the control device, in a case in which the target size information represents a size exceeding the reference size, and depending on whether or not the outer-side sheet sensor detects the target sheet, further sets a conveying interval between the target sheet and a next sheet following the target sheet to one of a first interval and a second interval longer than the first interval; and the control device stops power supply to one or both of the main heater block and the sub-heater block when a detected temperature of one or both of the main temperature sensor and the sub-temperature sensor exceeds a preset upper limit temperature.

2. The image forming apparatus according to claim 1, wherein the control device controls a power supply amount supplied to the main heater block and the sub-heater block by feedback control of the temperature detected by the main temperature sensor.

3. The image forming apparatus according to claim 1, wherein the control device controls a power supply amount supplied to the main heater block by feedback control of the temperature detected by the main temperature sensor, and controls a power supply amount supplied to the sub-heater block by feedback control of the temperature detected by the sub-temperature sensor.

* * * * *